United States Patent
Hostetter

(10) Patent No.: US 10,110,572 B2
(45) Date of Patent: Oct. 23, 2018

(54) TAPE DRIVE ENCRYPTION IN THE DATA PATH

(71) Applicant: Oracle International Corporation, Redwood City, CA (US)

(72) Inventor: David Hostetter, Louisville, CO (US)

(73) Assignee: Oracle International Corporation, Redwood Shores, CA (US)

( * ) Notice: Subject to any disclaimer, the term of this patent is extended or adjusted under 35 U.S.C. 154(b) by 30 days.

(21) Appl. No.: 14/601,479

(22) Filed: Jan. 21, 2015

(65) Prior Publication Data

US 2016/0212107 A1 Jul. 21, 2016

(51) Int. Cl.
*H04L 29/06* (2006.01)
*G06F 21/60* (2013.01)

(52) U.S. Cl.
CPC ........ *H04L 63/0471* (2013.01); *G06F 21/602* (2013.01); *H04L 63/02* (2013.01); *H04L 63/06* (2013.01); *H04L 63/062* (2013.01)

(58) Field of Classification Search
CPC ..... H04L 63/0471; H04L 63/02; H04L 63/06; G06F 21/602
USPC ...................................................... 713/153
See application file for complete search history.

(56) References Cited

U.S. PATENT DOCUMENTS

| 5,537,533 A | | 7/1996 | Staheli et al. | |
|---|---|---|---|---|
| 6,081,900 A | * | 6/2000 | Subramaniam | G06Q 20/382 |
| | | | | 707/999.01 |
| 6,687,700 B1 | * | 2/2004 | Cornelius | G06Q 10/107 |
| 6,732,269 B1 | * | 5/2004 | Baskey | H04L 63/166 |
| | | | | 713/153 |
| 7,277,941 B2 | * | 10/2007 | Ignatius | G06F 21/6209 |
| | | | | 709/225 |

(Continued)

FOREIGN PATENT DOCUMENTS

| CN | 101206698 A | 6/2008 |
|---|---|---|
| CN | 101506816 A | 8/2009 |

(Continued)

OTHER PUBLICATIONS

Hewlett-Packard Development Company, L.P., 'Encryption technology for HP StorageWorks LTO Ultrium Tape Drives (LTO-4 and LTO-5)', 2010 Hewlett-Packard Development Company, L.P., entire document, http://www.ndm.net/ips/pdf/hptippingpoint/4AA1-4878ENW.pdf.*

(Continued)

*Primary Examiner* — Luu Pham
*Assistant Examiner* — Ronald Baum
(74) *Attorney, Agent, or Firm* — Kilpatrick Townsend & Stockton LLP

(57) ABSTRACT

Implementations described and claimed herein provide encryption in the data path. In one implementation, login parameters from a primary data center are obtained. The login parameters include an identification of a destination device. An encryption key corresponding to the destination device is received. A write command including data for writing to the destination device is received from the primary data center. The data is encrypted inside a firewall of the primary data center using the encryption key. The encrypted data is routed over a data path to the destination device. As such, the data is secure during transmission over the network to the destination device.

19 Claims, 6 Drawing Sheets

(56) References Cited

U.S. PATENT DOCUMENTS

| | | | |
|---|---|---|---|
| 7,366,900 B2* | 4/2008 | Shambroom | G06F 21/41 380/279 |
| 7,853,019 B1 | 12/2010 | Chaudhary et al. | |
| 7,877,603 B2 | 1/2011 | Goodman et al. | |
| 7,882,354 B2 | 2/2011 | Greco et al. | |
| 7,965,844 B2 | 6/2011 | Greco et al. | |
| 7,990,994 B1* | 8/2011 | Yeh | H04L 12/4641 370/431 |
| 8,160,257 B1 | 4/2012 | Chaudhary et al. | |
| 8,219,799 B1* | 7/2012 | Lucchesi | H04L 63/105 713/150 |
| 8,312,064 B1* | 11/2012 | Gauvin | G06F 21/6218 707/822 |
| 8,601,256 B2* | 12/2013 | Baentsch | H04L 63/0471 713/151 |
| 8,635,461 B2 | 1/2014 | Chang et al. | |
| 8,712,044 B2* | 4/2014 | MacMillan | H04L 9/0861 380/277 |
| 8,938,400 B2 | 1/2015 | Estelle et al. | |
| 8,938,613 B2* | 1/2015 | Burch | H04L 9/14 713/153 |
| 8,955,059 B2* | 2/2015 | Hsu | H04L 63/08 713/183 |
| 9,195,839 B2 | 11/2015 | O'Hare et al. | |
| 2003/0018918 A1* | 1/2003 | Natsuno | H04L 63/0861 726/4 |
| 2003/0046586 A1* | 3/2003 | Bheemarasetti | H04L 63/0272 726/15 |
| 2003/0074319 A1* | 4/2003 | Jaquette | G06F 21/6218 705/51 |
| 2003/0084290 A1* | 5/2003 | Murty | H04L 63/0428 713/168 |
| 2003/0115447 A1* | 6/2003 | Pham | H04L 63/0428 713/153 |
| 2004/0015723 A1* | 1/2004 | Pham | H04L 63/10 726/27 |
| 2005/0050226 A1* | 3/2005 | Larson | H04L 63/083 709/245 |
| 2005/0152670 A1 | 7/2005 | Skaar | |
| 2005/0153642 A1* | 7/2005 | Matsushita | A46B 13/008 451/526 |
| 2006/0005048 A1* | 1/2006 | Osaki | G06F 11/1464 713/193 |
| 2006/0095768 A1* | 5/2006 | Hoshino | H04L 29/12009 713/168 |
| 2006/0123077 A1* | 6/2006 | Munetsugu | H04L 29/12009 709/203 |
| 2007/0038857 A1* | 2/2007 | Gosnell | G06F 17/30067 713/165 |
| 2007/0079119 A1* | 4/2007 | Mattsson | G06F 21/602 713/164 |
| 2007/0162744 A1* | 7/2007 | Hoshino | H04L 29/06027 713/156 |
| 2007/0233828 A1* | 10/2007 | Gilbert | G06F 11/1458 709/223 |
| 2008/0065898 A1 | 3/2008 | Greco et al. | |
| 2008/0152143 A1 | 6/2008 | Estelle et al. | |
| 2008/0294906 A1 | 11/2008 | Chang et al. | |
| 2009/0092252 A1* | 4/2009 | Noll | H04L 9/083 380/277 |
| 2009/0260064 A1* | 10/2009 | McDowell | G06F 21/10 726/4 |
| 2010/0235633 A1* | 9/2010 | Asano | G06F 21/10 713/167 |
| 2010/0333116 A1* | 12/2010 | Prahlad | G06F 17/30082 719/328 |
| 2011/0010496 A1 | 1/2011 | Kirstenpfad et al. | |
| 2011/0022812 A1* | 1/2011 | van der Linden | G06F 9/5077 711/163 |
| 2011/0202763 A1 | 8/2011 | Martin et al. | |
| 2012/0131341 A1* | 5/2012 | Mane | G06F 21/57 713/168 |
| 2012/0246472 A1* | 9/2012 | Berengoltz | G06F 11/1448 713/165 |
| 2012/0331088 A1* | 12/2012 | O'Hare | G06F 21/6227 709/214 |
| 2013/0219472 A1* | 8/2013 | Hsu | H04L 63/0815 726/4 |
| 2014/0101719 A1* | 4/2014 | Lakshminarayanan | G06F 21/6245 726/3 |
| 2014/0122866 A1* | 5/2014 | Haeger | H04L 63/061 713/153 |
| 2014/0281918 A1* | 9/2014 | Wei | H04L 67/02 715/234 |
| 2014/0359047 A1* | 12/2014 | Lee | H04L 67/2852 709/213 |
| 2015/0154418 A1* | 6/2015 | Redberg | G06F 17/30106 713/165 |

FOREIGN PATENT DOCUMENTS

| | | |
|---|---|---|
| CN | 101821696 A | 9/2010 |
| CN | 103176881 A | 6/2013 |
| CN | 103823767 A | 5/2014 |
| CN | 105224417 A | 1/2016 |
| DE | 102009031923 A1 | 1/2011 |
| EP | 2059886 A1 | 5/2009 |
| IN | 2007DN02512 A | 8/2007 |
| JP | 2004504645 A | 2/2004 |
| JP | 2004508538 A | 3/2004 |
| JP | 2009520985 A | 5/2009 |
| WO | 9506261 A1 | 3/1995 |
| WO | 9912101 A2 | 3/1999 |
| WO | 2008028824 A1 | 3/2008 |

OTHER PUBLICATIONS

Bernau, D., et al, 'Enforceable Security in the Cloud to Uphold Data Ownership (Project acronym: ESCUDO-CLOUD)', Dec. 31, 2017, European Union's Horizon 2020 research and innovation programme, entire document, http://www.escudocloud.eu/public-del/D1.5.pdf.*

* cited by examiner

TAPE DRIVE ENCRYPTION IN THE DATA PATH

TECHNICAL FIELD

Aspects of the present disclosure relate to encryption services in network data storage systems, among other functions, and more particularly to sending encrypted data between a primary data center and a remote network device, such as a tape drive.

BACKGROUND

The continuous expansion of the Internet, the expansion and sophistication of enterprise computing networks and systems, the proliferation of content stored and accessible over such networks, and numerous other factors continue to drive the need for large sophisticated data storage systems. Consequently, as the demand for data storage continues to increase, larger and more sophisticated storage systems are being designed and deployed. Many large scale data storage systems utilize virtual or physical tape drive systems including arrays of storage media, such as magnetic tape or disk back stores, to which data may be written and stored.

As the number of components, the number of users, and the volume of data increases, so does the size and complexity of the storage systems. For example, a cloud infrastructure may be utilized to provide access to remote storage systems over a network. Conventional systems, however, may fail to ensure the security of data as it is transmitted over the network to a remote cloud device, such as a tape drive. Some such systems send the data unsecured over the network, and the data is only encrypted once it is received at the remote cloud device. Other such systems that attempt to encrypt the data prior to sending it over the network are plagued by performance degradation and slow data transfers. Further, many of these attempts require the data to be decrypted at the remote storage system prior to sending the data to the remote cloud device for storage, where the data is encrypted again. With these conventional systems, data is either transmitted from a source over an unsecured infrastructure to a remote cloud storage system or the data is encrypted at the source in a slow and cumbersome manner before transmission.

It is with these observations in mind, among others, that various aspects of the present disclosure were conceived and developed.

SUMMARY

Implementations described and claimed herein address the foregoing problems by providing encryption in the data path. In one implementation, login parameters from a data source are obtained. The login parameters include an identification of a destination device. An encryption key corresponding to the destination device is received. A write command including data for writing to the destination device is received from data source. The data is encrypted inside a firewall of the data source using the encryption key. The encrypted data is routed over a data path to the destination device.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Security of data, particularly during transmission, is of increasing concern to users. Accordingly, aspects of the present disclosure involve systems and methods for providing encryption in the data path. In one aspect, an encryption device is deployed along a data path between a primary data center and a destination site. The encryption device may be, for example, a switch or a storage device, such as a tape drive, configured to perform encryption services. The encryption device is configured to encrypt data inside a firewall of the primary data center before transmitting the data to the destination site where the encrypted data is stored. As such, the data is secure during transmission over the network to the destination site.

Figure 1:
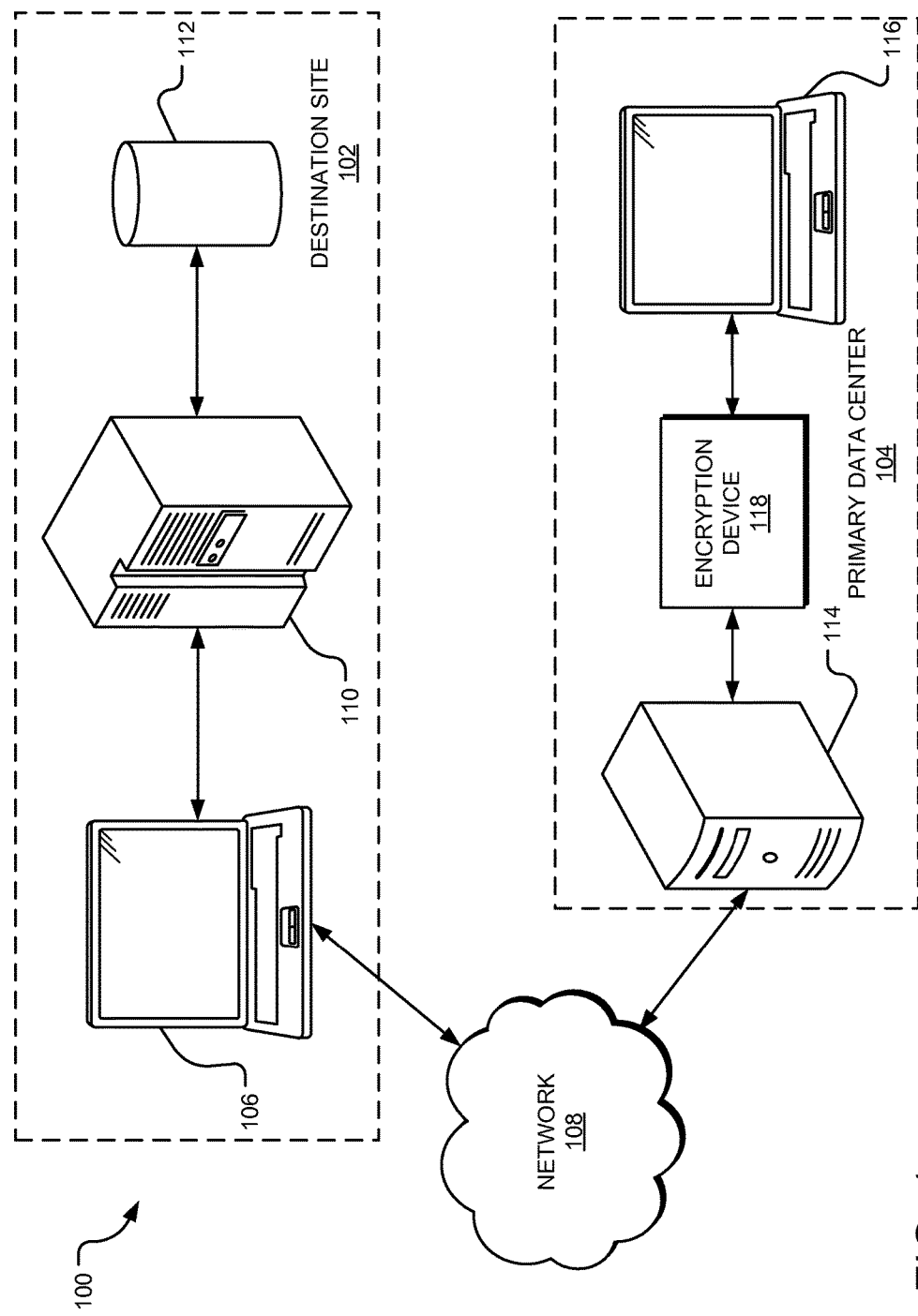
FIG. 1 illustrates an example storage system configured to transmit encrypted data over a network.

To begin a detailed description of an example storage system 100 configured to transmit encrypted data over a network, reference is made to FIG. 1. In one implementation, the storage system 100 includes a destination site 102, a primary data center 104, and a host 106. The destination site 102 is accessible by the primary data center 104 using a network 108. In particular, the primary data center 104 may access the destination site 102 by remotely logging into the host 106 to control and/or provide data for storage to the destination site 102. It will be appreciated, however, that the various networks may comprise an integrated network, and the connections between the networks represent but one possible network topology. The depicted networks may also be local in nature or geographically dispersed, such as with large private enterprise networks or the Internet.

In one implementation, the host 106 provides various functions for the storage system 100, including controlling the operation of the destination site 102. The host 106 may be included in the destination site 102, the primary data center 104, and/or in another network connected via the network 108. Moreover, the host 106 may be connected directly to the various networks or the devices within the network. As such, it is possible that many unique terminals or computing elements may be present within the storage system 100 and through which administrator functions may be performed. In general, the host 106 comprises one or more host computers in communication with one or more destination devices 110, including storage media 112, such as a physical or virtual tape drive.

The primary data center 104, in one implementation, includes at least one server 114 connecting one or more user devices 116 to the network 108. The server 114 may be a single server, a plurality of servers with each such server being a physical server or a virtual machine, or a collection of both physical servers and virtual machines. A virtual machine is a software implementation of a machine or component (e.g., a computing device) that executes programs like a physical machine. For example, a virtual machine may emulate an operating system.

The user device 116 is generally any form of computing device capable of interacting with the network 108, such as a terminal, a workstation, a personal computer, a portable computer, a mobile device, a tablet, a multimedia console, and the like. In some implementations, the primary data center 104 includes one or more user interfaces, including, for example, a business user interface, permitting a user to interact with the storage network 102 to access and/or write data to the destination site 102.

The destination device 110 may be a storage appliance, including the storage media 112. Generally, the destination device 110 manages the storage of data on the storage media 112. In one implementation, the storage media 112 includes a magnetic tape drive on which data may be written and stored. In another implementation, the storage media 112 may involve spinning media (e.g., disc drives), various forms of solid state memory, and/or other storage media. The host 106 controls the flow of data to and from the storage media 112, including controlling the operation of the destination device 110.

To ensure the security of data as it is communicated between the primary data center 104 and the destination site 102, an encryption device 118 is deployed along the data path. In one implementation, the encryption device 118 is inside a firewall of the primary data center 104. The encryption device 118 may be a storage device comprising one or more solid state chips or other storage media and configured to intercept communications between the primary data center 104 and the destination site 102 and encrypt data prior to transmission to the destination site 102 for storage. The encryption device 118 utilizes a large caching buffer to maintain performance, thereby significantly decreasing encryption and transmission time.

In one implementation, the encryption device 118 encrypts data inside the primary data center 104 using an encryption format corresponding to the storage media 112 at the destination site 102 where the data will be written to and stored. For example, the data may be encrypted using a tape encryption format where the data will be stored on a tape drive. Because the data is encrypted in a format corresponding to the storage media 112, the encrypted data is received and written to the storage media 112 without needing to decrypt and re-encrypt the data for storage. To encrypt the data in a corresponding format, encryption keys are shared between the destination site 102 and the primary data center 104. In some aspects, a key management appliance at the destination site 102 is clustered with a key management appliance at the performance data center 104 to manage encryption keys. The key management cluster permits the host 106 at the destination site 102 to read the data from the storage media 112 using the encryption key retrieved via the key management appliance. Similarly, a host application running on the server 114 at the primary data center 104 can read the data from the destination site 102 and decrypt the data inside the firewall of the primary data center 104 to ensure the data is secured during transmission. Because the storage media 112 is encrypted using an encryption key managed by the key management cluster, the encrypted storage media 112 may be physically transported to another data center, and a host at that data center can read the encrypted destination device through access to the key management cluster.

The encryption device 118 is transparent to the host application running on the server 114 of the primary data center 104. Stated differently, from the perspective of the host application of the primary data center 104, it appears as though the host application is communicating directly with the destination device 110 via the host 106. To accomplish this transparency, the encryption device 118 intercepts login parameters for a destination device from the host application of the primary data center 104. The encryption device 118 uses the login parameters to login into the destination device 110. Using an encryption key for the destination device received from the key management cluster, the encryption device 118 receives data from the host application at the primary data center 104, caches the data, and encrypts the data. The encryption device 118 routes the encrypted data to the destination device 110 for storage on the storage media 112. All commands exchanged between the primary data center 104 and the destination site 102, including read and write commands, are routed through the encryption device 118, thereby ensuring security of the data.

Figure 2:
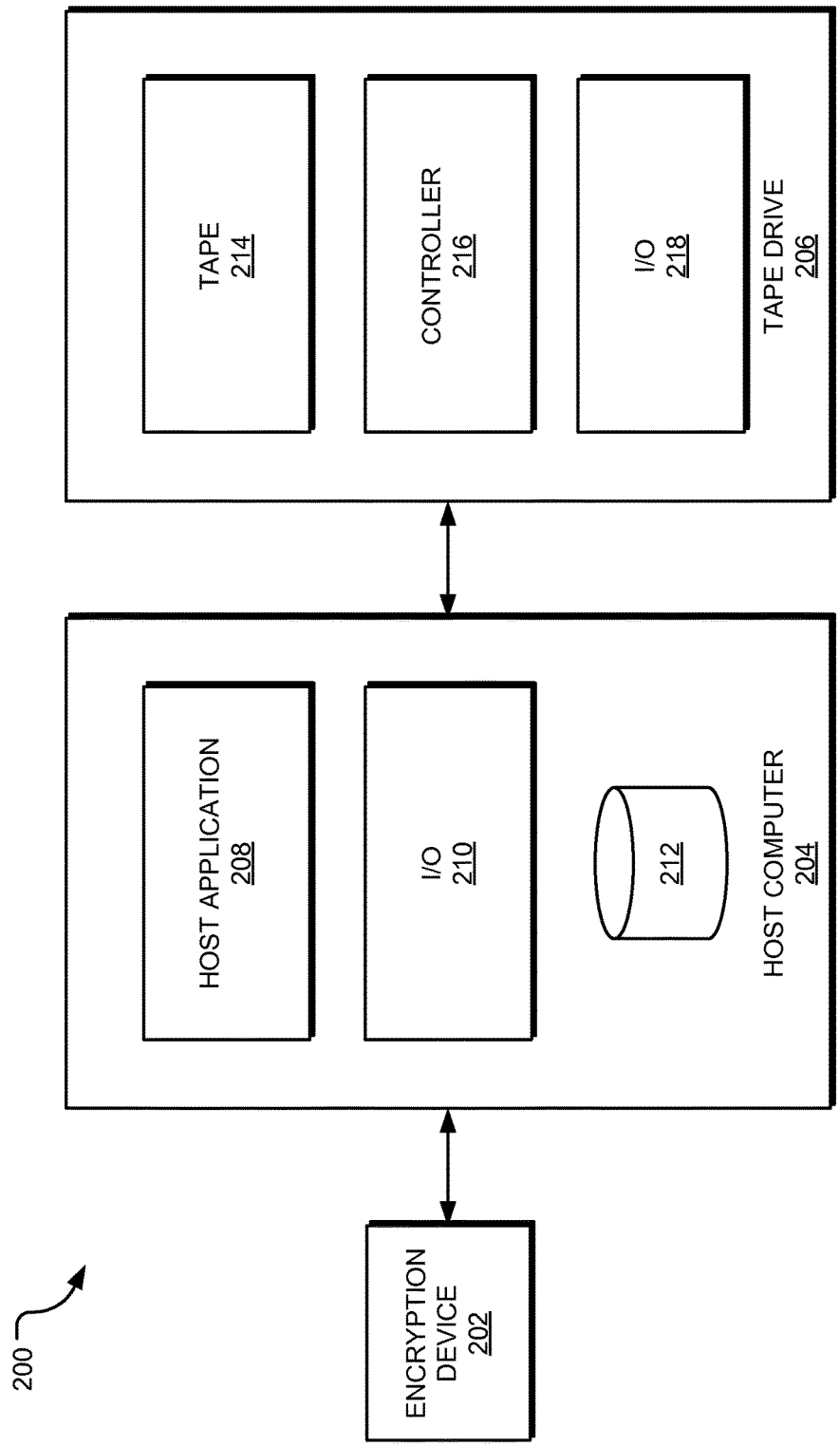
FIG. 2 shows an example tape drive storage system in communication with an encryption device for providing encryption in a data path.

Turning to FIG. 2, an example tape drive storage system 200 in communication with an encryption device 202 for providing encryption in a data path is shown. In one implementation, the tape drive storage system 200 includes a host computer 204 and a tape drive 206, which may be similar to the host 106 and the storage media 112, respectively. The host computer 204 may provide instructions to control the various operations supported by the tape drive 206, in addition to one or more data blocks to be written to or read from the tape drive 206.

Although only a few components of the host computer 204 and the tape drive 206 are depicted and described herein, it will be appreciated that the host computer 204 and the tape drive 206 may include additional components and functionality. For example, the host computer 204 may include one or more host bus adapters and/or signal multiplexers, and the tape drive 206 may include any number of physical tapes, blades, and/or control mechanisms to physically maneuver tapes into and out of one or more readers. Thus, any number of additional components are contemplated in aiding the operation of the host computer 204 and the tape drive 206 of FIG. 2.

In one implementation, the host computer 204 includes an application 208, one or more input/output (I/O) ports 210, and one or more computer readable media 212. Generally, the application 208 provides a user interface for accessing the tape drive 206. The user interface generated by the application 208 may be presented on a display associated with the host computer 204 and may be used to issue one or more commands to the tape drive 206 to control the storage and retrieval of data. In one implementation, the application 208 is accessed via a network. The computer readable media 212 is configured to store information concerning the operation of the tape drive 206. The I/O ports 210 communicate along a communication line with the tape drive 206. The host computer 204 may include additional ports and communication lines to provide fail redundancies. Generally, the host computer 204 utilizes the I/O ports 210 to transmit operational commands to the tape drive 206, as well as data encrypted by the encryption device 202 for storage on the tape drive 206.

To facilitate the communication between the host computer 204 and the tape drive 206, the tape drive 206 includes one or more I/O ports 218. Through the I/O ports 218, the tape drive 206 receives commands and/or encrypted data for storage on tape 214. In one implementation, a controller 216 executes on the tape drive 206 and controls the operation of the tape drive 206 in response to received commands. For example, the host computer 204 may provide a command to the tape drive 206 to store incoming encrypted data in a particular location on the tape 214. In response, the controller 216 controls the storage of the received encrypted data on the tape 214 at the requested position.

In one implementation, the encryption device 202 is deployed along the data path to encrypt data using a tape encryption format prior to transmission to the tape drive 206 for storage. Because the data is encrypted in a tape encryption format, the encrypted data is received and written to the tape drive 206 without needing to decrypt and re-encrypt the data for storage. In one implementation, the encryption device 202 encrypts the data using an encryption key. The encryption keys are managed by a key management cluster, such that it is not necessary to store the encryption key on the tape drive 206. Because the encryption keys are managed by the key management cluster, the tape drive 206 may be moved to other locations and the data read by various host computers with access to the key management cluster.

Figure 3:
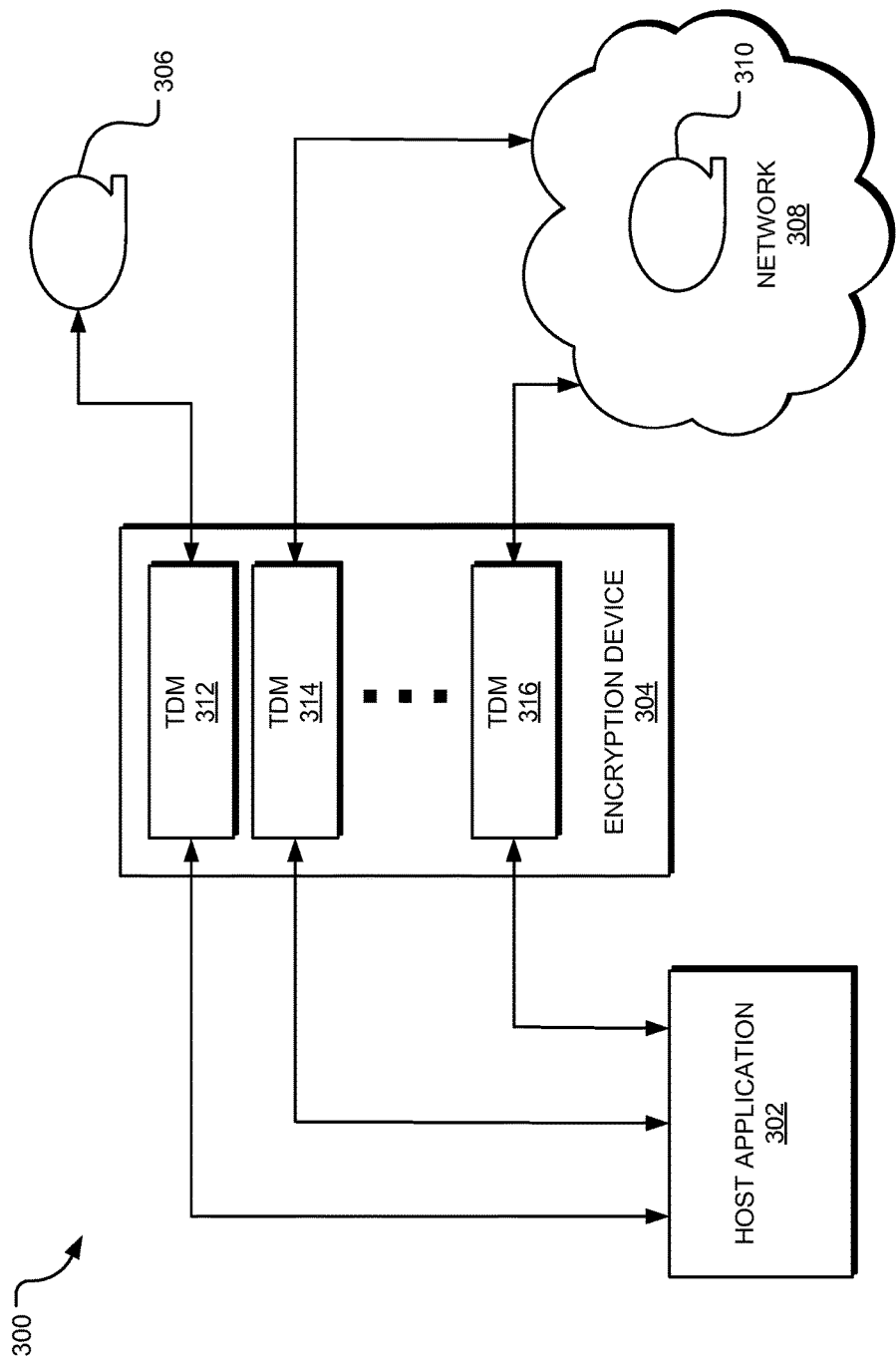
FIG. 3 depicts an example encryption device providing encryption in the data path.

Referring to FIG. 3, an example encryption device providing encryption in the data path is shown. In one implementation, a storage system 300 includes an encryption device 304 deployed along a data path between a host application 302 and one or more storage devices, such as an extended copy storage device 306 and a remote cloud device 310 accessible over a network 308. The storage devices 306 and 310 may be tape drives or other storage devices.

In one implementation, the encryption device 304 includes tape drive main (TDM) cards 312-316 identifying all discovered storage devices that are in communication with the encryption device 304. Stated differently, each of the devices 306 and 310 are in target mode where they report their presence to the encryption device 304, which builds a table listing the available storage devices. In one implementation, the TDM cards 312-316 discover the storage devices 306, 310 and list descriptors for the storage device 306, 310, including, but not limited to, a worldwide known name and destination identification for each of the storage devices 306 and 310. The encryption device 304 maintains the table of discovered storage devices while waiting for the host application 302 to issue a write command.

The host application 302 may obtain a list of the available storage devices 306, 310 via discovery. In one implementation, the host application 302 obtains a list of target storage devices from the encryption device 304. For example, as shown in FIG. 3, the list of available storage devices would include the extended copy storage device 306 and the remote cloud device 310 and any other discovered storage devices. The host application 302 may issue a request to archive or otherwise write data to the remote cloud device 310, for example, with a login command. In one implementation, the encryption device 304 automatically intercepts the login command. In another implementation, the host application 302 issues an encryption command with the login command to prompt the encryption device 304 to intercept the login command.

After intercepting the login command, the encryption device 304 extracts descriptors from the login command, including, without limitation, a source identification, a destination identification, and a worldwide known name for the remote cloud device 310. The encryption device 304 may check the table of discovered storage devices to determine whether the descriptors match any available storage devices. If there is a match, the encryption device 304 returns a good status to the host application 302, logs into the remote cloud device 310, and notifies the host application 302 of the login.

The host application 302 issues a write command to write data to the remote cloud device 310. The write command may include the data for storage on the remote cloud device 310. In one implementation, the encryption device 304 intercepts, buffers, and encrypts the data. The encrypted data is then routed to the remote cloud device 310 for storage. The data is encrypted and securely transmitted to the remote cloud device 310 quickly. The remote cloud device 310 receives and writes the encrypted data for storage.

The encryption device 304 is transparent to the host application 302. Stated differently, from the perspective of the host application 302, it appears as though the host application 302 is communicating directly with the remote cloud device 310. In one implementation, all commands exchanged between the host application 302 and the remote cloud device 310, including read and write commands, are routed through the encryption device 304, thereby ensuring security of the data.

Figure 4:
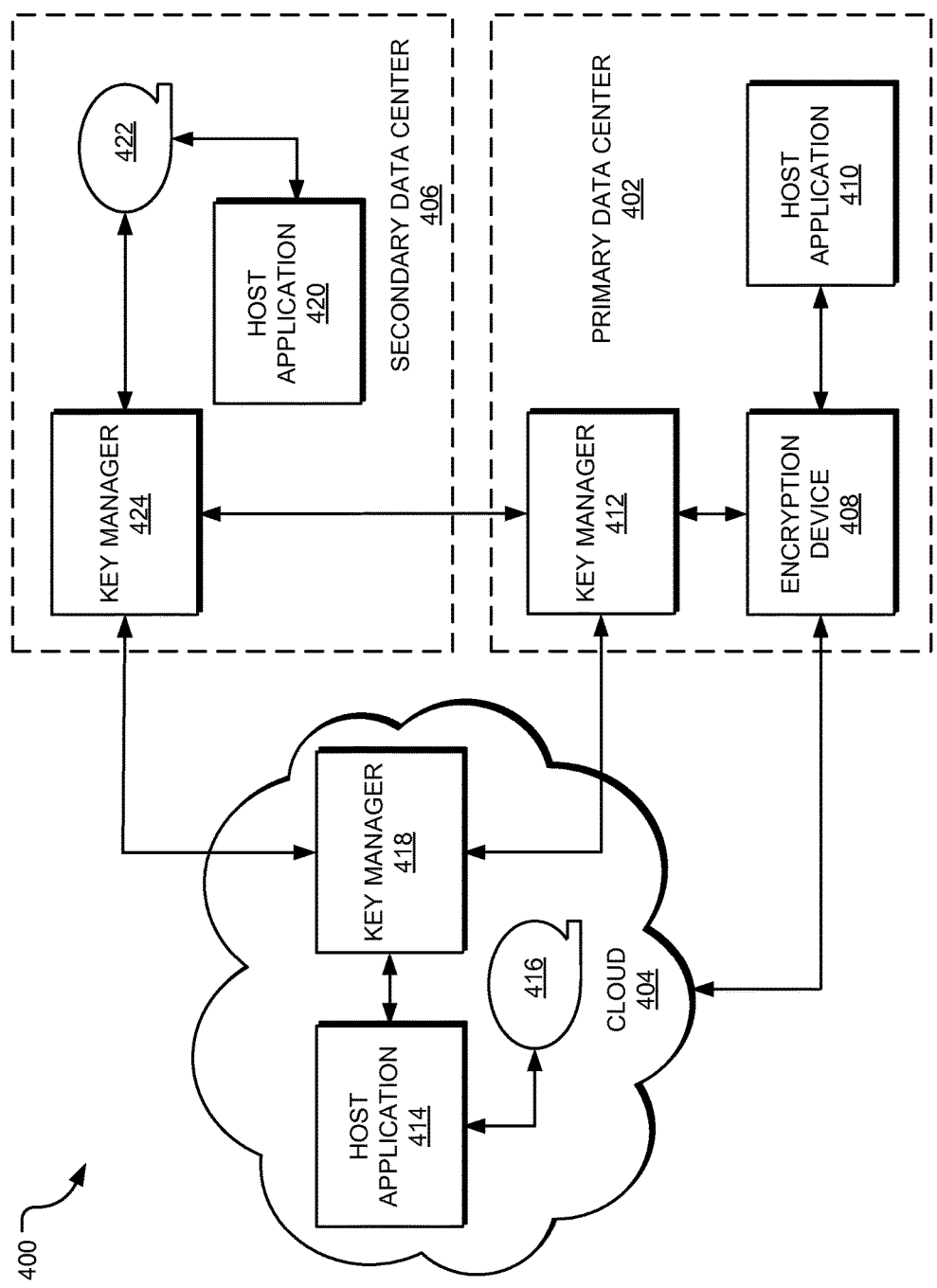
FIG. 4 shows an example system for sending encrypted data between a primary data center and a remote storage device over a network.

FIG. 4 shows an example system 400 for sending encrypted data between a primary data center 402 and a remote storage device over a network. In one implementation, the system 400 includes a cloud 404 hosting one or more remote storage devices and a secondary data center 406.

The primary data center 402, in one implementation, includes an encryption device 408 in communication with a host application 410 and a key manager 412. To ensure the security of data as it is communicated between the primary data center 402 and a remote storage device, the encryption device 408 is deployed along the data path between the host application 410 and the remote storage device. In one implementation, the encryption device 408 is inside a firewall of the primary data center 404, as shown in FIG. 4.

The host application 410 may access a remote storage device 416 hosted by the cloud 404 by remotely logging into a host application 414 to control and/or provide data for storage to the remote storage device 416. The host application 414 may be similar to the host application 208 discussed with respect to FIG. 2. The remote storage device 416 may be a storage appliance, including storage media. Generally, the host application 414 manages the storage of data on the storage media. In one implementation, the storage media includes a magnetic tape drive on which data may be written and stored. In another implementation, the storage media may involve spinning media (e.g., disc drives), various forms of solid state memory, and/or other storage media. The host application 414 controls the flow of data to and from the storage media, including controlling the operation of the remote storage device 416. In one implementation, the cloud 404 further hosts a key manager 418.

The secondary data center 406, in one implementation, includes a host application 420 configured to control and/or provide data for storage to a storage device 422, which may involve a tape drive, spinning media, various forms of solid state memory, and/or other storage media. The secondary data center 406 further includes a key manager 424 in communication with the key managers 412 and 418.

In one implementation, each of the key managers 412, 418, and 424 are one or more key management appliances connected via an Internet Protocol (IP) network to form a key management cluster. A graphical user interface running on a user device may be used to communicate with the key management cluster over the IP network to configure and manage the cluster. In one implementation, the key management cluster registers and authenticates encryption devices, such as the encryption device 408, and automatically creates, provisions, manages, and deletes encryption keys. The encryption keys may be retained for the full data lifecycle, and the key management cluster can manage thousands of storage devices and millions of encryption keys to scale the system 400 easily and without disruption. The keys within the key management cluster may be secured with AES-256 encryption and locked with a split-key password to ensure integrity of the encryption keys. The key management cluster provides a comprehensive, application and operating system agnostic platform for encryption key management from a single source for a distributed and heterogeneous storage infrastructure, such as the system 400.

The encryption device 408 may be an encrypting storage device comprising one or more silicone chips or other storage media and configured to intercept communications between the host application 410 and the host application 414 and encrypt data prior to transmission over the cloud 404 to the remote storage device 416 for storage. The encryption device 408 utilizes a large caching buffer to maintain performance, thereby significantly decreasing encryption and transmission time.

In one implementation, the encryption device 408 encrypts data inside the primary data center 402 using an encryption format corresponding to the remote storage device 416 where the data will be written to and stored. For example, the data may be encrypted using a tape encryption format where the remote storage device 416 is a tape drive. Because the data is encrypted in a format corresponding to the remote storage device 416, the encrypted data is received and written to the remote storage device 416 without needing to compress, decrypt, or re-encrypt the data for storage. Stated differently, the encryption device 408 encrypts the data within the primary data center 402, the encrypted data is sent to the remote storage device 416 via the cloud 404, and the encrypted data is stored in the form it is received at the remote storage device 416. To encrypt the data in a corresponding format, an encryption key for the remote storage device 416 is shared between the key managers 412, 418, and 424. The encryption device 408 encrypts the data using the shared encryption key.

The encryption device 408 is transparent to the host application 410. Stated differently, from the perspective of the host application 410 of the primary data center 402, it appears as though the host application 410 is communicating directly with the remote storage device 416 via the host application 414. To accomplish this transparency, the encryption device 408 intercepts login parameters for the remote storage device 416 from the host application 410. The encryption device 408 uses the login parameters to login into the remote storage device 416. Using an encryption key for the remote storage device 416 received from the key manager 412, the encryption device 408 receives data from the host application 410, caches the data, and encrypts the data. The encryption device 408 routes the encrypted data to the remote storage device 416 for storage. All commands exchanged between the host application 410 and the remote storage device 416, including read and write commands, may be routed through the encryption device 408, thereby ensuring security of the data.

The key management cluster permits a host application to read the data from the remote storage device 416 using the encryption key retrieved from various locations. For example, the host application 410 at the primary data center 402 can read the data from the remote storage device 416 and decrypt the data inside the firewall of the primary data center 402 to ensure the data is secured during transmission. Because the remote storage device 416 is encrypted using an encryption key managed by the key management cluster, the remote storage device 416 may be physically transported to another data center, and a host at that data center can read the encrypted data through access to the key management cluster. For example, data may be read from the remote storage device 416 by the host application 420 at the secondary data center 406 through access to the key manager 424.

Figure 5:
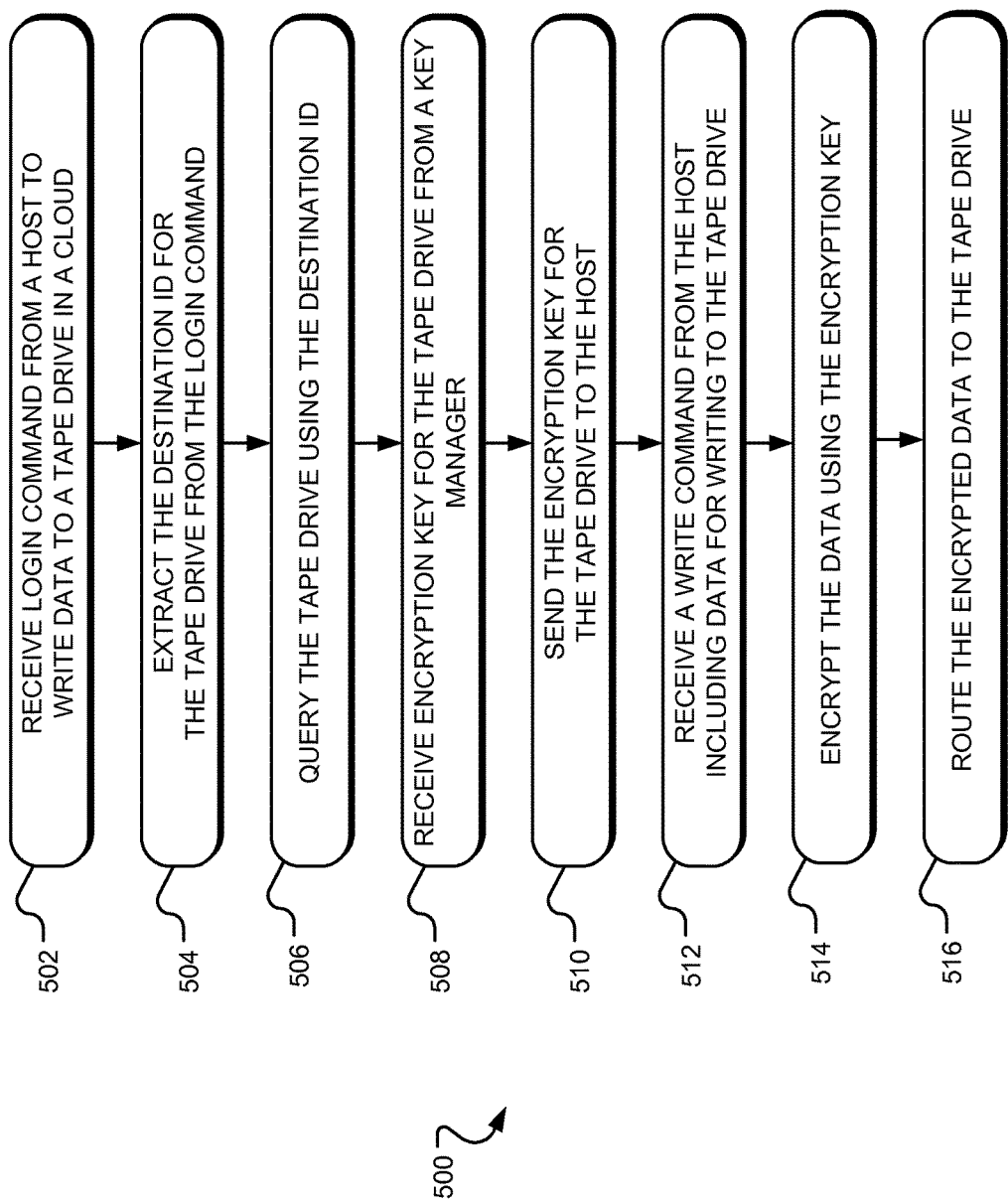
FIG. 5 illustrates example operations for providing tape drive encryption in a data path.

Turning to FIG. 5, example operations 500 for providing tape drive encryption in a data path are illustrated. In one implementation, an operation 502 receives a login command from a host to write data to a destination device, such as a tape drive, hosted by a cloud computing infrastructure. The operation 502 may automatically intercept the login command from the host. The login command includes parameters, such as a destination identification corresponding to the tape drive, a source identification corresponding to the host, and a worldwide known name for the tape drive. An operation 504 extracts the login parameters, including the destination identification from the login command, and an operation 506 queries the tape drive using the destination identification.

In one implementation, an operation 508 receives an encryption key for the tape drive from a key manager. The key manager may be a key management appliance included in a key management cluster. An operation 510 may send the encryption key for the tape drive to the host. An operation 512 receives a write command from the host including data for writing to the tape drive, and an operation 514 encrypts the data using the encryption key. An operation 516 then routes the encrypted data to the tape drive for storage. The data is thus secure during transmission over the network to the tape drive.

Figure 6:
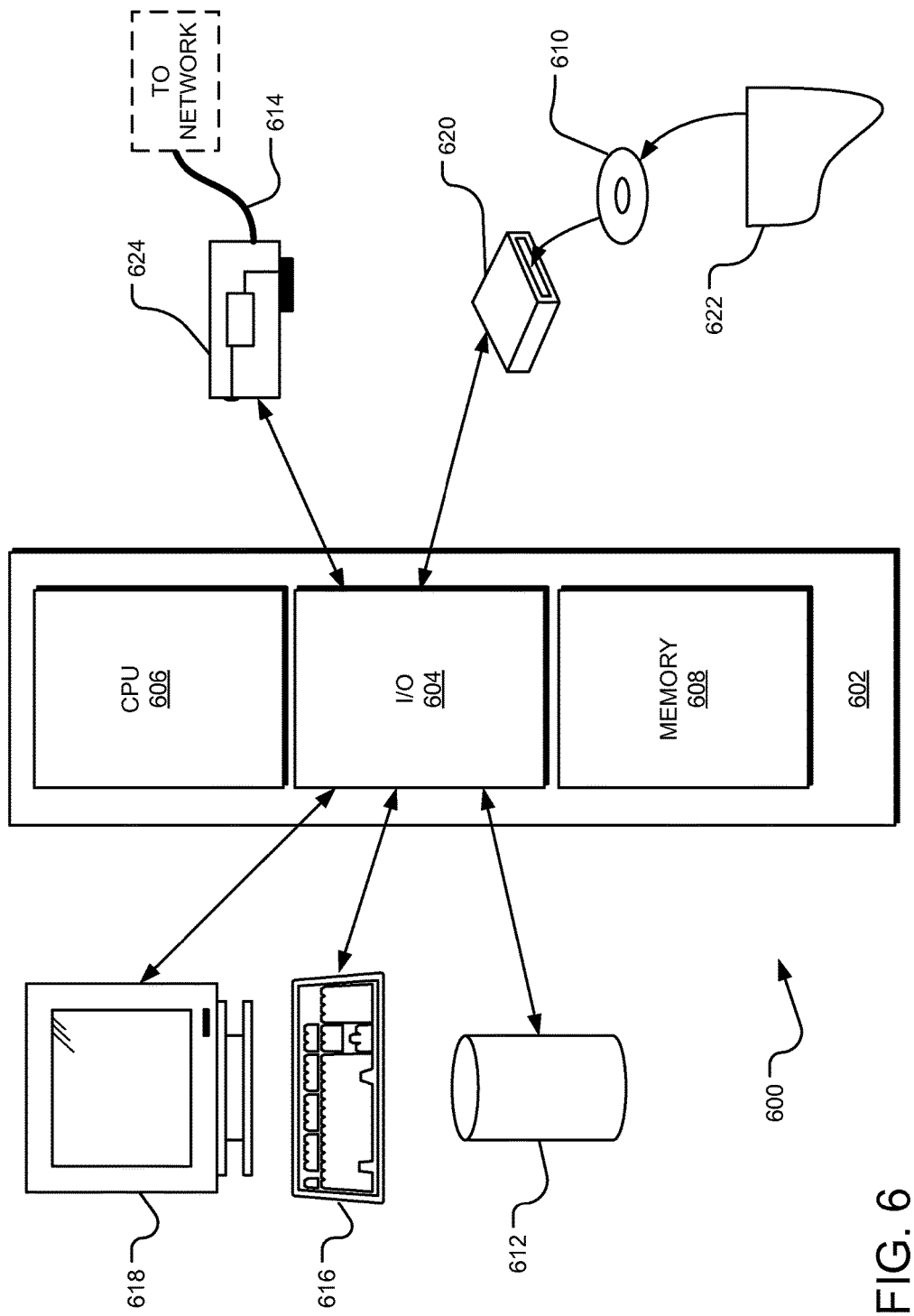
FIG. 6 is an example computing system that may implement various systems and methods discussed herein.

Referring to FIG. 6, a detailed description of an example computing system 600 having one or more computing units that may implement various systems and methods discussed herein is provided. The computing system 600 may be applicable to the hosts, storage devices, servers, key managers, or other computing devices. It will be appreciated that specific implementations of these devices may be of differing possible specific computing architectures not all of which are specifically discussed herein but will be understood by those of ordinary skill in the art.

The computer system 600 may be a general computing system is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer, such as one or more external computers made available via a cloud computing architecture. The presently described technology is optionally implemented in software devices loaded in memory 608, stored on a configured DVD/CD-ROM 610 or storage unit 612, and/or communicated via a wired or wireless network link 614, thereby transforming the computer system 600 in FIG. 6 to a special purpose machine for implementing the described operations.

The I/O section 604 is connected to one or more user-interface devices (e.g., a keyboard 616 and a display unit 618), a disc storage unit 612, and a disc drive unit 620. In the case of a tablet device, the input may be through a touch screen, voice commands, and/or Bluetooth connected keyboard, among other input mechanisms. Generally, the disc drive unit 620 is a DVD/CD-ROM drive unit capable of reading the DVD/CD-ROM medium 610, which typically contains programs and data 622. Computer program products containing mechanisms to effectuate the systems and methods in accordance with the presently described technology may reside in the memory section 604, on a disc storage unit 612, on the DVD/CD-ROM medium 610 of the computer system 600, or on external storage devices made available via a cloud computing architecture with such computer program products, including one or more database management products, web server products, application server products, and/or other additional software components. Alternatively, a disc drive unit 620 may be replaced or supplemented by an optical drive unit, a flash drive unit, magnetic drive unit, or other storage medium drive unit. Similarly, the disc drive unit 620 may be replaced or supplemented with random access memory (RAM), magnetic memory, optical memory, and/or various other possible forms of semiconductor based memories commonly found in smart phones and tablets.

The network adapter 624 is capable of connecting the computer system 600 to a network via the network link 614, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets, laptops, personal computers, multimedia consoles, gaming consoles, set top boxes, and the like.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, storage operations, encryption operations, host applications, encryption keys, key management operations, software and other modules and services may be embodied by instructions stored on such storage systems and executed by the processor 602. Some or all of the operations described herein may be performed by the processor 602. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 602 and a user may interact with a Graphical User Interface (GUI) using one or more user-interface devices (e.g., the keyboard 616, the display unit 618, etc.) with some of the data in use directly coming from online sources and data stores.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for providing data path encryption, the method comprising:

obtaining, by an encryption device, login parameters from a data source, wherein the login parameters are obtained from a request to store data of the data source that is intercepted by the encryption device, wherein the encryption device is located between the data source and a destination storage device in a firewall that contains both the encryption device and the data source;

extracting, by the encryption device, from the login parameters a descriptor of a destination storage device to which the request was directed by the data source;

matching, by the encryption device, the descriptor of the destination storage device to a storage device identifier in a table of discovered storage devices, the table of discovered storage devices comprising a plurality of discovered storage devices corresponding to a plurality of different encryption formats, where each discovered storage device of the plurality of discovered storage devices is configured to read data encoded in a respective encoding format of a plurality of different encoding formats that are different and distinct from the plurality of different encryption formats, the plurality of discovered storage devices comprising the destination storage device corresponding to a particular encryption format of the different encryption formats and configured to read data in a particular encoding format of the plurality of different encoding formats;

communicating, by the encryption device, with a first key manager appliance located within the firewall, to obtain an encryption key for the destination storage device from a key management cluster, the key management cluster comprising key manager appliances sharing encryption keys among the key manager appliances, the key manager appliances comprising the first key manager appliance;

consequent to the communicating, obtaining, by the encryption device, a shared encryption key from the key management cluster for the destination storage device, the shared encryption key to facilitate encryption in the particular encryption format of the plurality of different encryption formats that corresponds to the destination storage device;

receiving, by the encryption device, a write command from the data source, wherein the write command includes data for writing to the destination storage device;

encrypting, by the encryption device, the data using the shared encryption key so that the data is encrypted in the particular encryption format corresponding to the destination storage device in addition to being encoded in the particular encoding format readable by the destination storage device; and routing, by the encryption device, the encrypted data over a data path from the encryption device to the destination storage device.

2. The method of claim 1, wherein the data source is associated with a primary data center and the destination storage device is a tape drive.

3. The method of claim 1, further comprising:
receiving a read command for the data from the data source;
retrieving the encrypted data from the destination storage device;
receiving the encryption key for the destination storage device; and
decrypting the encrypted data inside the firewall of the data source.

4. The method of claim 1, further comprising:
discovering the destination storage device; and
listing the destination storage device in the table of discovered storage devices.

5. The method of claim 1, wherein the data is cached prior to encryption.

6. The method of claim 1, wherein the data is encrypted using an encrypting storage device.

7. The method of claim 6, wherein the encrypting storage device is a tape drive.

8. One or more non-transitory, computer-readable storage media storing computer-executable instructions for performing a computer process on a computing system, the computer process comprising:

obtaining login parameters by an encryption device from a data source wherein the login parameters are obtained from a request to store data of the data source that is intercepted by the encryption device, wherein the encryption device is located between the data source and a destination storage device in a firewall that contains both the encryption device and the data source;

extracting from the login parameters including a descriptor of a destination storage device;

matching the descriptor of the destination storage device to a storage device identifier in a table of discovered storage devices, the table of discovered storage devices comprising a plurality of discovered storage devices corresponding to a plurality of different encryption formats, where each discovered storage device of the plurality of discovered storage devices is configured to read data encoded in a respective encoding format of a plurality of different encoding formats that are different and distinct from the plurality of different encryption formats, the plurality of discovered storage devices comprising the destination storage device corresponding to a particular encryption format of the different encryption formats and configured to read data in a particular encoding format of the plurality of different encoding formats;

communicating, with a first key manager appliance located within the firewall, to obtain an encryption key for the destination storage device from a key management cluster, the key management cluster comprising key manager appliances sharing encryption keys among the key manager appliances, the key manager appliances comprising the first key manager appliance;

consequent to the communicating, obtaining a shared encryption key from the key management cluster for the destination storage device, the shared encryption key to facilitate encryption in the particular encryption format of the plurality of different encryption formats that corresponds to the destination storage device;

receiving a write command at the encryption device from the data source, wherein the write command includes data for writing to the destination storage device;

encrypting the data using the shared encryption key so that the data is encrypted in the particular encryption format corresponding to the destination storage device in addition to being encoded in the particular encoding format readable by the destination storage device; and routing the encrypted data over a data path to the destination storage device.

9. The one or more non-transitory, computer-readable storage media of claim 8, wherein the data is cached prior to encryption.

10. The one or more non-transitory, computer-readable storage media of claim 8, wherein the destination storage device is a tape drive.

11. The one or more non-transitory, computer-readable storage media of claim 8, wherein the data source is associated with a primary data center and the data is encrypted inside a firewall of the primary data center.

12. A system for providing data path encryption, the system comprising:
a destination storage device in communication with a data source over a network;
a key management cluster having a plurality of key management appliances configured to generate and share encryption keys among the key management appliances, the key manager appliances comprising a first key management appliance; and
an encryption device deployed along a data path between the destination storage device and the data source and in communication with the key management cluster, wherein the encryption device is located in a firewall that contains both the encryption device and the data source, the encryption device configured to:
communicate with a first key manager appliance located within the firewall to obtain a shared encryption key for the destination storage device from the key management cluster, the shared encryption key to facilitate encryption in a particular encryption format that corresponds to the destination storage device, wherein the destination storage device is identified in a table of discovered storage devices comprising a plurality of discovered storage devices corresponding to a plurality of different encryption formats, where each discovered storage device of the plurality of discovered storage devices is configured to read data encoded in a respective encoding format of a plurality of different encoding formats that are different and distinct from the plurality of different encryption formats, and the destination storage device is configured to read data in a particular encoding format of the plurality of different encoding formats;
encrypt, using the shared encryption key, data corresponding to a command to write the data to the destination storage device so that the data is encrypted in the particular encryption format corresponding to the destination storage device in addition to being encoded in the particular encoding format readable by the destination storage device;
intercept the write command from the data source intended for the destination storage device;
obtain login parameters from the intercepted write command to login to the destination storage device; and send the data encrypted in the particular encryption format securely over the data path to the destination storage device.

13. The system of claim 12, wherein the destination storage device is a tape drive.

14. The system of claim 12, wherein the encryption device is an encrypting storage device.

15. The system of claim 14, wherein the encrypting storage device is a tape drive.

16. The system of claim 12, wherein the data source is associated with a primary data center and the encryption device is deployed along the data path inside a firewall of the primary data center.

17. The system of claim 12, wherein the destination storage device is a remote storage device hosted in a cloud computing infrastructure.

18. A method for providing data path encryption in a computer system, the method comprising:
intercepting an archive request from a host application of a data center of the computer system, wherein the archive request is a communication from the host application to a destination storage device for storing data at the destination storage device and the interception occurs by an encryption device of the data center, wherein the encryption device is located between the host application and the destination storage device in a firewall that contains both the encryption device and the computer system;
extracting, by the encryption device, login information from the archive request that enables the encryption device to login to the destination storage device;
communicating, by the encryption device with a first key manager appliance located within the firewall, to obtain an encryption key for the destination storage device from a key management cluster, the key management cluster comprising key manager appliances sharing encryption keys among the key manager appliances, the key manager appliances comprising a first key manager appliance;
consequent to the communicating, obtaining, by the encryption device, a shared encryption key from the key management cluster for the destination storage device, the shared encryption key to facilitate encryption in a particular encryption format of a set of different encryption formats that corresponds to the destination storage device, wherein the destination storage device is identified in a table of discovered storage devices comprising a plurality of discovered storage devices corresponding to a plurality of different encryption formats, where each discovered storage device of the plurality of discovered storage devices is configured to read data encoded in a respective encoding format of a plurality of different encoding formats that are different and distinct from the plurality of different encryption formats, and the destination storage device is configured to read data in a particular encoding format of the plurality of different encoding formats;
encrypting, by the encryption device, the data from the host application using the shared encryption key so that the data is encrypted in the particular encryption format corresponding to the destination storage device in addition to being encoded in a particular format readable by the destination storage device; and
routing, by the encryption device, the encrypted data from the data center to the host application of the destination storage device.

19. The method of claim 18, wherein the computer system includes multiple data centers and at least one destination storage device, and wherein each data center and the destination storage device includes a respective host application and a respective encryption device such that the respective encryption devices communicate with each other and share the encryption keys for each respective host application.

\* \* \* \* \*